(12) United States Patent
Diaz-Vallellanes

(10) Patent No.: US 8,637,767 B2
(45) Date of Patent: Jan. 28, 2014

(54) ANTI-THEFT DEVICES FOR ELECTRICAL WIRES

(76) Inventor: Francisco Diaz-Vallellanes, Toa Alta, PR (US)

(*) Notice: Subject to any disclaimer, the term of this patent is extended or adjusted under 35 U.S.C. 154(b) by 89 days.

(21) Appl. No.: 13/506,465

(22) Filed: Apr. 21, 2012

(65) Prior Publication Data
US 2012/0266447 A1 Oct. 25, 2012

Related U.S. Application Data

(60) Provisional application No. 61/517,619, filed on Apr. 21, 2011.

(51) Int. Cl.
*E04H 12/24* (2006.01)
*E02D 27/32* (2006.01)

(52) U.S. Cl.
USPC .......................................... 174/45 R; 52/296

(58) Field of Classification Search
USPC ................ 52/40, 296, 297, 848; 174/45 R
See application file for complete search history.

(56) References Cited

U.S. PATENT DOCUMENTS

| 1,189,459 | A | * | 7/1916 | Lunoin | 174/45 R |
|---|---|---|---|---|---|
| 3,323,765 | A | * | 6/1967 | Fernandez | 52/295 |
| 3,574,982 | A | * | 4/1971 | Wakonig | 52/148 |
| 6,872,883 | B2 | * | 3/2005 | Ginsburg | 174/45 R |
| 7,765,770 | B2 | * | 8/2010 | Fournier | 52/843 |
| 7,851,702 | B2 | * | 12/2010 | Fournier et al. | 174/45 R |
| 7,874,126 | B2 | * | 1/2011 | Fournier | 52/843 |
| 7,884,283 | B1 | * | 2/2011 | Ousley | 174/45 R |
| 2004/0098935 | A1 | * | 5/2004 | Henderson | 52/296 |
| 2007/0022706 | A1 | * | 2/2007 | Fournier | 52/726.4 |
| 2009/0266016 | A1 | * | 10/2009 | Kraft | 52/296 |

* cited by examiner

*Primary Examiner* — Jeanette E Chapman
*Assistant Examiner* — James Buckle, Jr.
(74) *Attorney, Agent, or Firm* — Héctor M. Reyes Rivera

(57) ABSTRACT

A first device useful as a support base for utility poles, which integrates an anti-theft security system directed to prevent theft of power supply wires used in underground power distribution systems. The security system includes a dual internal conduit system for housing the wires and at least two head bolts inserted in an individual lateral straight conduit. Similarly, a second device includes a mold having an inverted T-shaped housing for the wires and a head bolt inside the upright conduit section of said inverted T-shaped housing. In both devices, the wires are moved in an angled position and secured by tightening the corresponding bolt.

20 Claims, 15 Drawing Sheets

ANTI-THEFT DEVICES FOR ELECTRICAL WIRES

This application claims priority under 35 USC 119 to provisional application No. 61/517,619 filed on Apr. 21, 2011.

TECHNICAL FIELD OF THE INVENTION

This invention relates to anti-theft safety devices directed to prevent theft of power supply wires. Particularly, the invention is directed to anti-theft devices useful against the copper containing wires, which are used in the power distribution systems.

BACKGROUND OF THE INVENTION

In the power distribution systems, electric power is provided to public areas such as parks, streets, highways, traffic streets via lighting fixtures, which are generally supported at the top end of hollow utility post, usually made of metal. The pole has an elongated body with a flange at its lower end. Said flange is secured to a concrete base by a series of anchor bolts. The required wires of the lighting fixture are electrically connected to the lighting fixture from where are extended through the internal cavity of the post to the near end of the post, wherein they are electrically connected to the power cables coming from the power distribution system. The cables from the power distribution system are buried underground and once they are near the supporting base are upwardly extended though the concrete base used to support the utility post. The electrical connection of the lighting fixture wires with the underground power distribution wires or cables coming from the underground system via a concrete support base is conveniently set at a high of the utility post having an aperture on its surface. Such aperture is known in the art as "hand hole"; which allows the access to the cavity of the pole. It is generally covered with a cover plate which is easily removable. This aperture serves as an access to maintenance personnel in order to provide maintenance of the lighting fixture whenever it is necessary.

Unfortunately, thieves often gain access to the electric wiring via said hand hole and with the assistance of a motor vehicle are able to pull up and remove the electrical wiring or cables from the underground power systems.

Similarly, the wires or cables of the underground power distribution systems may be stolen after the electrical disconnection of the cables from any substation following by the pulling out of such wires with the help of a motor vehicle. Said outage at places such as hospitals, apartment buildings, factories and highways may produce multiple inconveniences, for instance it may cause damage to sophisticated equipment, loss of time and money and may even cause death to innocent people depending of powered equipment as well as to the copper thieves themselves. The theft of electrical wiring is well documented and it is a growing problem throughout the world. The stolen wire, having copper as a main component, is sold as a scrap metal at a high price. As a consequence, the general public and public infrastructure is impacted negatively in multiple manners and at a high economic cost while the power distribution systems continuously require to be restored, without any certainty that the stealing-replacement circle finally end. Therefore, there is a need for devices and methods capable of preventing the theft of cables of the underground power distribution system.

OBJECTS AND SUMMARY OF THE INVENTION

It is an object of the invention to provide an anti-theft security system and method thereof in order to prevent the theft of electrical wiring from the underground power distribution system. Another object of the invention is to provide a base for supporting a lighting fixture support post, which has integrated a security system capable of securing the wires of the power distribution systems. Another object of the invention is to provide a permanent security system integrated to the supported base of utility pole. Yet another object of the invention is to provide anti-theft security systems that once assembled are neither visible nor accessible to thieves. Still another object of the invention is to provide a utility post support base wherein the cables incoming and the cables outgoing from said base are secured in a permanent and individually manner. In an additional embodiment, another object of the instant invention is to provide a security stand for protecting electrical cables or wires of the underground electrical power distribution systems which is not accessible to the thieves and that may be permanently installed in one or multiple a predetermined and secret locations along the underground power distribution systems lines.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION OF THE EMBODIMENTS

The following detailed description illustrates the invention by way of example and is not limited to the particular limitations presented herein as principles of the invention. This description is directed to enable one skilled in the art to make and use the invention by describing embodiments, adaptations, variations and alternatives of the invention. Potential variations of the limitations herein described are within the scope of the invention. Particularly, the instant description uses as an example a circular base and a circular stand having a particular size and height, nonetheless the physical elements or characteristics, such as geometry, size or height illustrated herein may be varied using the same or similar principles and limitations regarding the security mechanism in order to provide bases and stands having different shapes or sizes that are within the scope of the instant invention.

The terms "wires" or "cables" are used throughout the text interchangeable and in singular or plural terms to identify the electrical wiring required to conduct electricity in the power distribution system. Even though represented as single units in the instant drawings, such single unit may represent multiple wires or cables. It is also understood that the security systems herein disclosed are useful to secure any sort of utility wires, including non-electrical ones.

Figure 1:
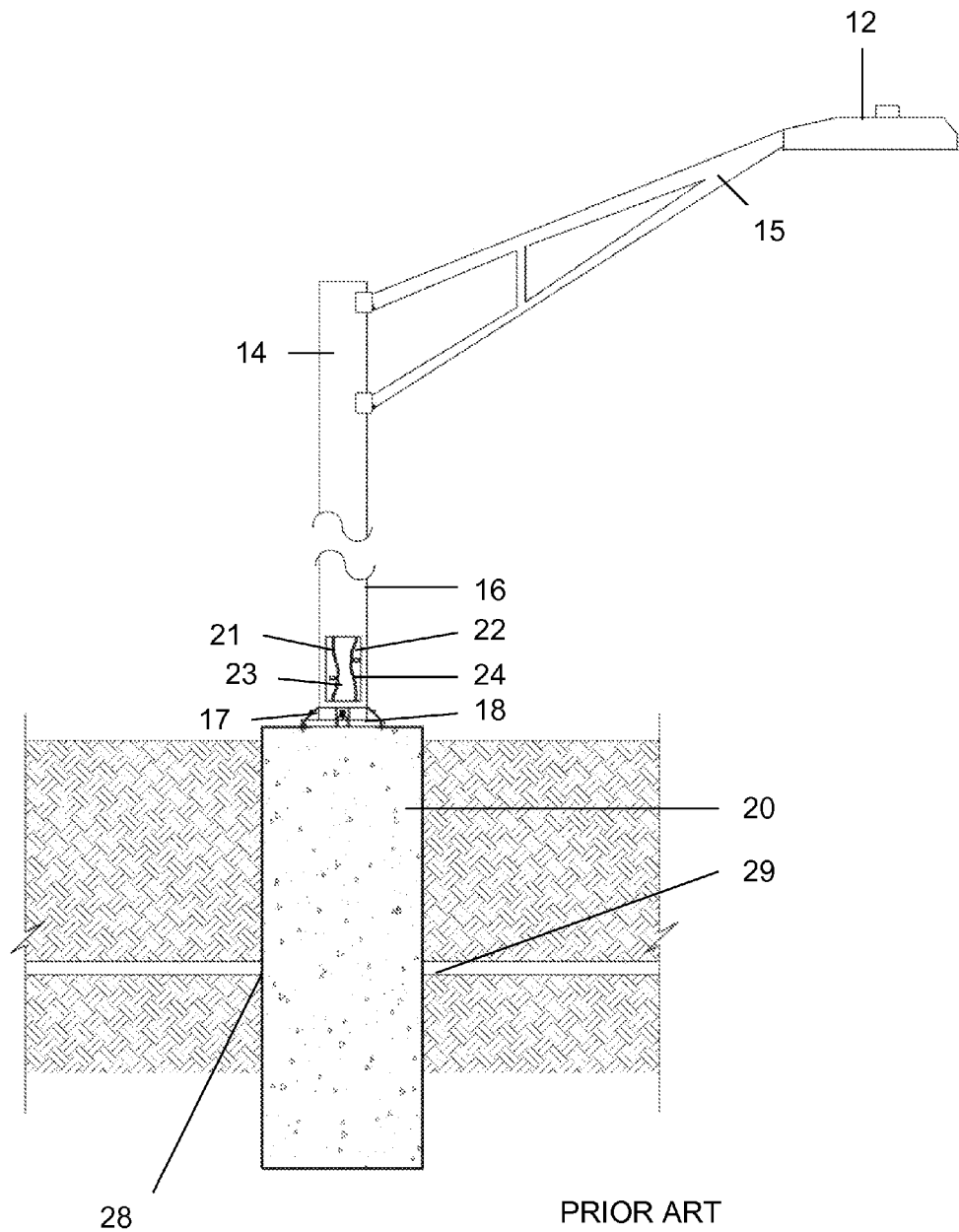
FIG. 1 shows a front view of lighting fixture connected to the corresponding utility pole and the supported base of the utility post, as commonly used; wherein the underground surface is omitted in order to show details.
Figure 2:
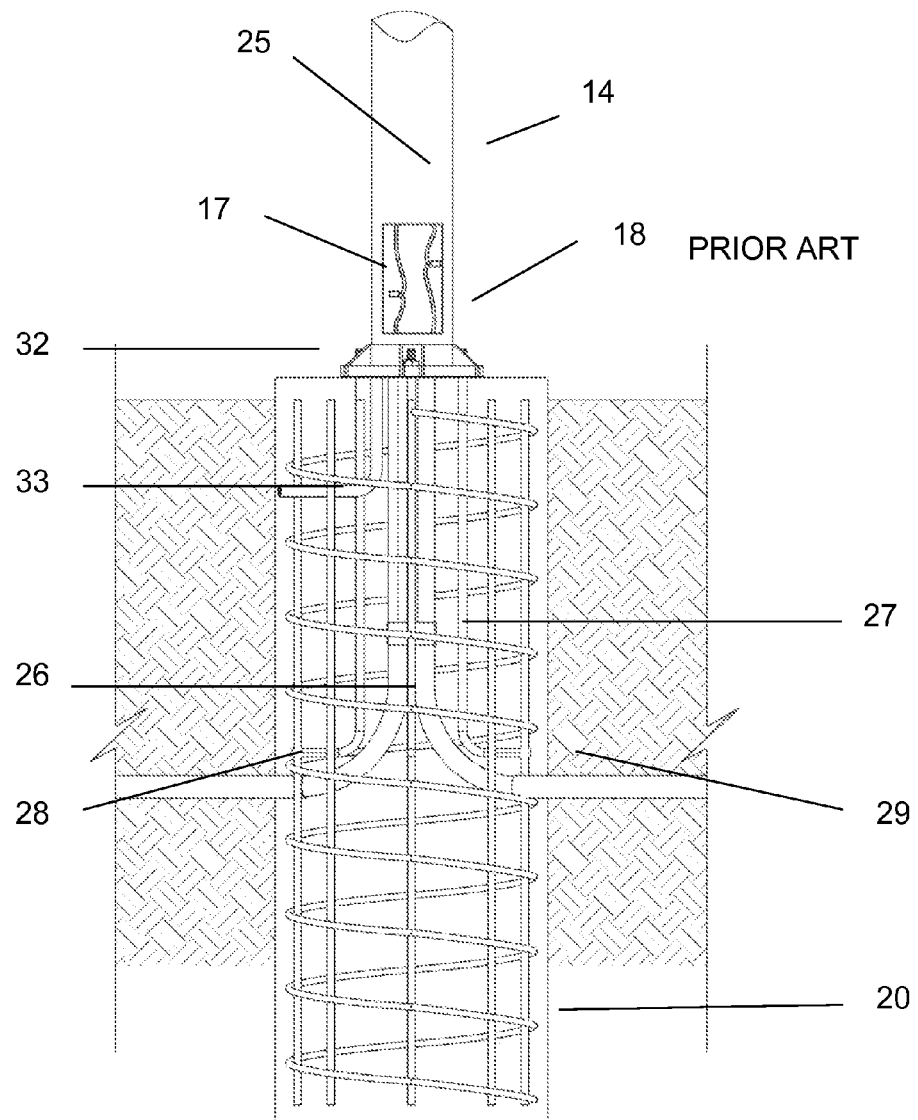
FIG. 2 illustrates a front view of a prior art common base used to support utility poles wherein the concrete main body in omitted in order to show its internal components of said base.
Figure 10:
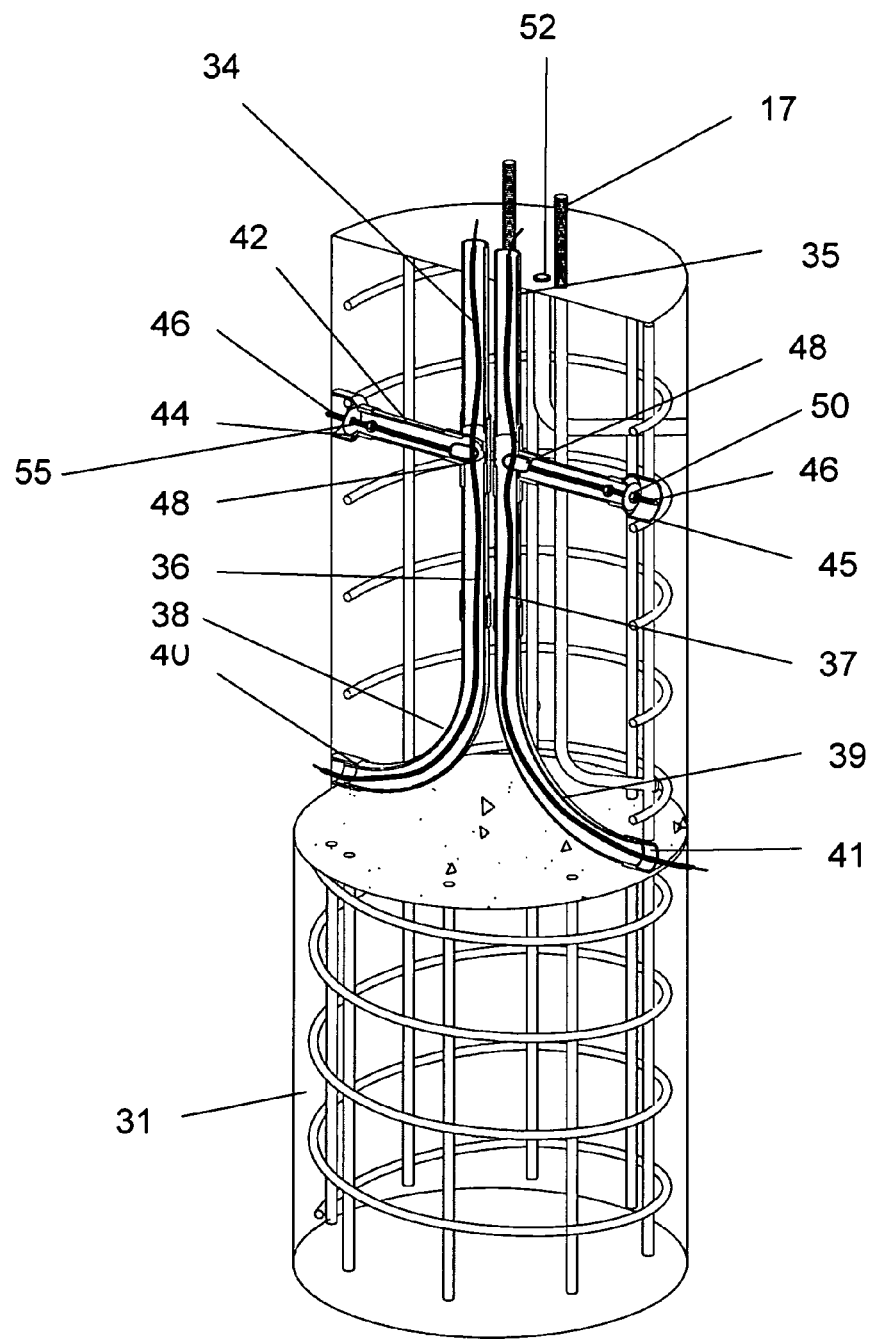
FIG. 10 is a perspective view, illustrating the supported base as shown in FIG. 9 after the electrical cables have been inserted and previous to be secured at the interior of the security base.
Figure 11:
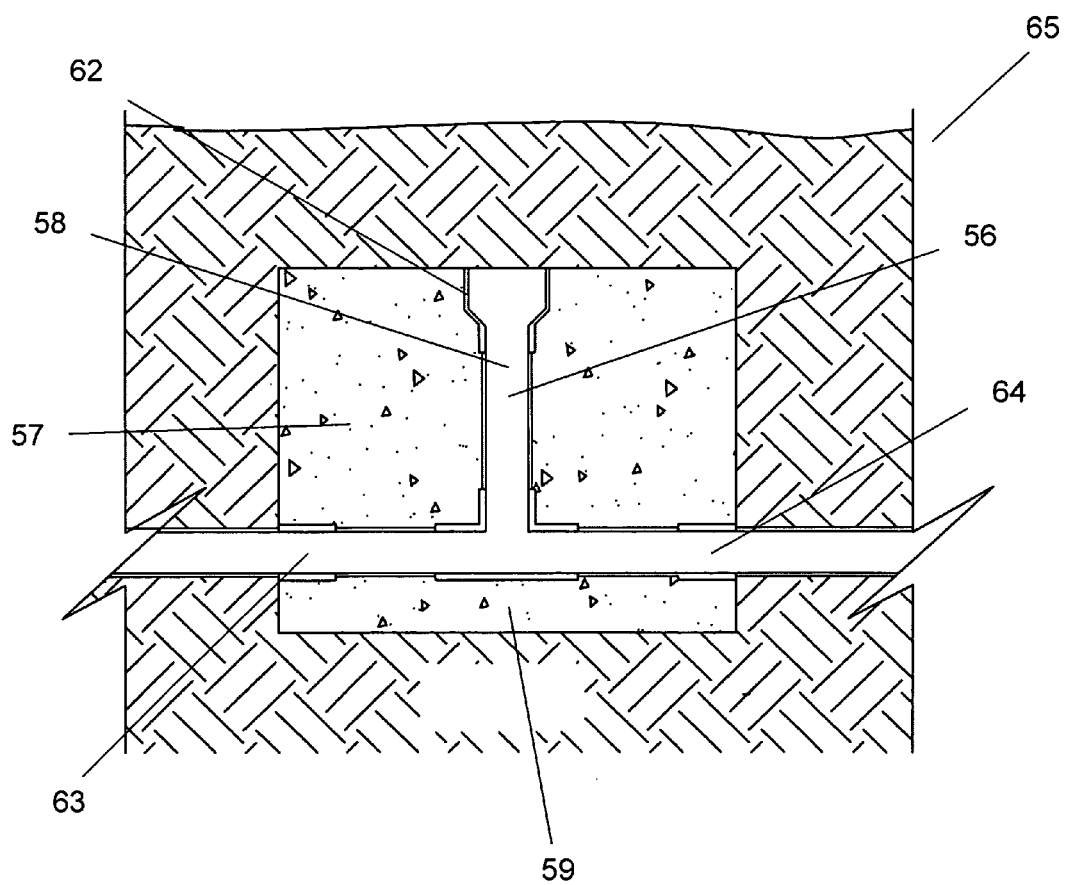
FIG. 11 illustrates a second embodiment of the instant invention, comprising a security stand previous to introduce the wires of the underground power distribution system, wherein the underground surface has been omitted in order to show details of the connection.
Figure 12:
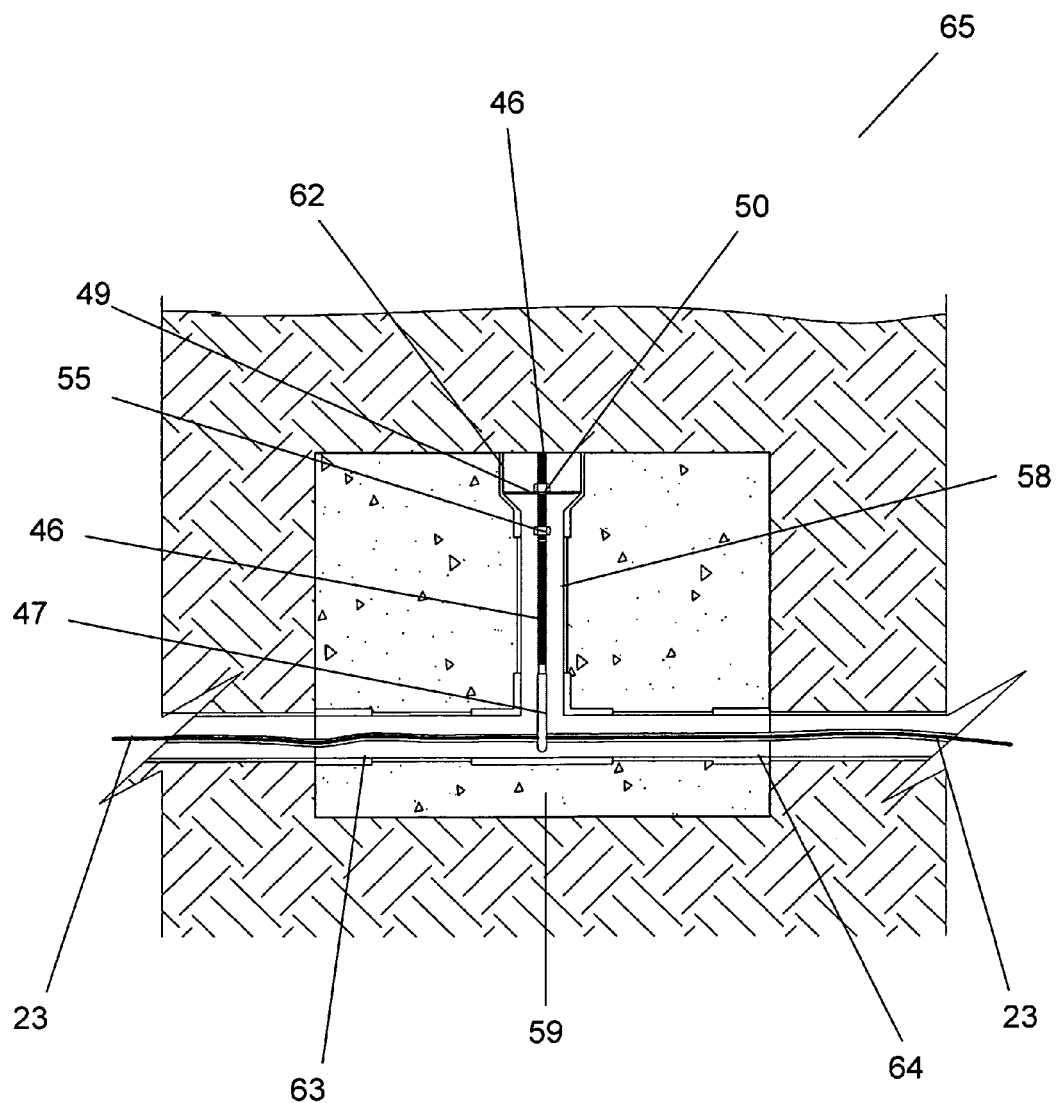
FIG. 12 illustrates the embodiment of FIG. 11, wherein the half front section of the housings of the underground wires and the security stand have been cut away in order to show the details of the security system in the security stand previous to securing the wires.
Figure 13:
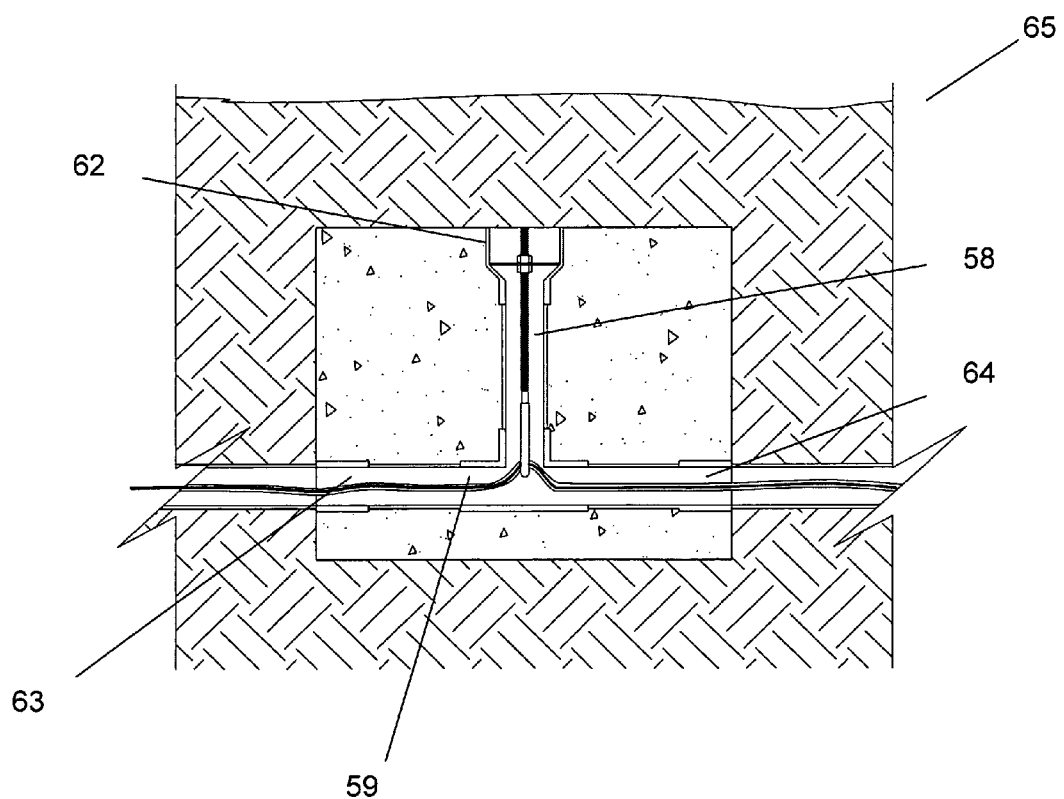
FIGS. 13 and 14 illustrate the security stand with the cables or wires coming from the power distribution system already introduced and secured in the security stand, wherein the front section of the security stand housing and the wires housing of the power distribution system have been cut away in order to the details of the invention.

In reference to the drawings, and in general terms, FIGS. 1 and 2 are directed to illustrate an example of a base used to support utility poles in the prior art. FIGS. 3 through 10 illustrate an embodiment according to the instant invention comprising a support base for utility posts having an anti-theft system integrated internally and useful in preventing the theft of electrical cables or wires. On the other hand, FIGS. 11 through 13 illustrate details of a second security device according to the instant invention having a protecting system integrated internally that is useful in preventing the electrical wires theft along the power underground line and useful in protecting underground power lines from a predetermined locations along the underground power distribution systems.

As illustrated in FIG. 1, lighting fixtures such as 12 are connected to the top end 15 of a hollow utility post 14 while the bottom section 16 of the post 14 is supported by a concrete base 20. Insertion of the anchor bolts 17 through openings at the flange 18 and further adjustment with corresponding nuts properly secure the post 14 to the base 20. Wires 21, 22 feeding the lighting fixture 12 are extended through the interior cavity of the post 14 and are connected to the main cables 23, 24 coming from and going out the underground power distribution system at the near lower end of the post 14. As illustrated in FIG. 2, said electrical connection is properly situated at the site of an aperture 25 on surface of post 14 that is known as "hand hole", which provides access to the interior of the post and to the mentioned electrical connection, which is intended to gain access to the interior of the post by maintenance personnel.

Details of the internal components of base 20 are illustrated in FIG. 2, wherein the main concrete body has been omitted for clarity. It usually comprises internal upright and straight wires housing 26 and 27 located at the interior of the base 20. Said wire housing 26 and 27 are connected at the left and right sides to the wire housing of the underground power distribution system via ends 28 and 29, respectively. As illustrated in FIGS. 1 and 2, the main cables or wires 23, 24 of the underground power distribution system are extended through the housing 26 and 27 at the interior of the base 20 and come in or out, respectively, from the interior of the base to the top section of said base. Each end of the incoming 23 and outgoing 24 cables are intended to be electrically connected to the wires 21 and 22 feeding the lighting fixture 12. The base 20 may be totally underground and in some instances, partially above surface. As it is already known, thieves regularly vandalized the cover of the hand hole 25 gaining access to the electric cables or wires 21, 22, 23 and 24. Once the wires 23, 24 are pulled from the underground power distribution system via said hand hole 25, with the assistance of, for instance a car or a truck; they are easily removed without any resistance.

Figure 3:
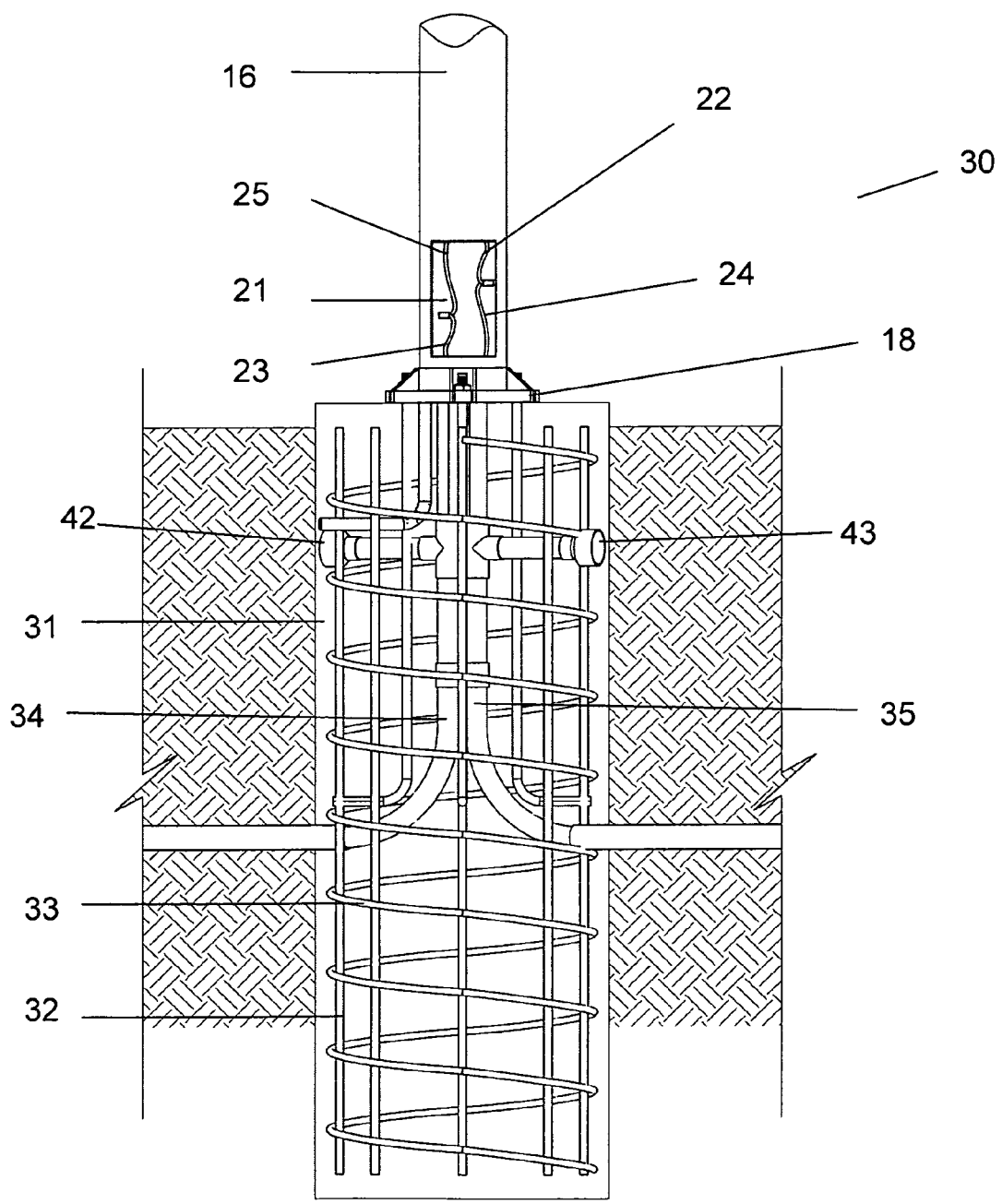
FIG. 3 is a front view illustrating one of the embodiments according to the instant invention comprising a supported base having the electrical cables already inserted and secured and wherein the security base according to the invention is already installed to a utility pole. The external concrete main body of the base has been omitted in order to show its internal components of said embodiment.
Figure 4:
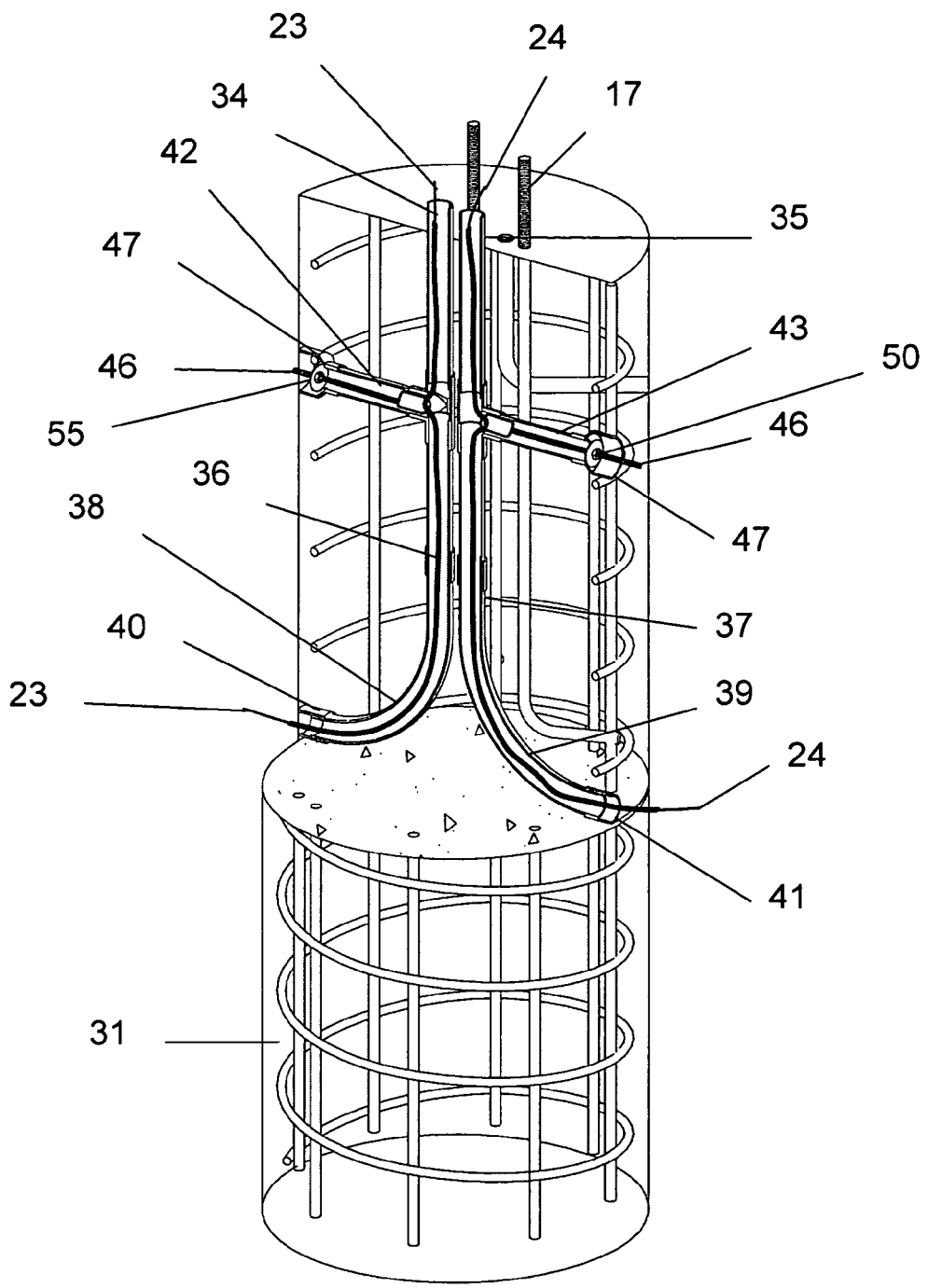
FIG. 4 is a front view, illustrating the embodiment of the instant invention illustrated in FIG. 3, wherein the half upper section of the base has been cutaway in order to show one of the preferred manner in which the electrical cables or wires are secured in the security base system.
Figure 5:
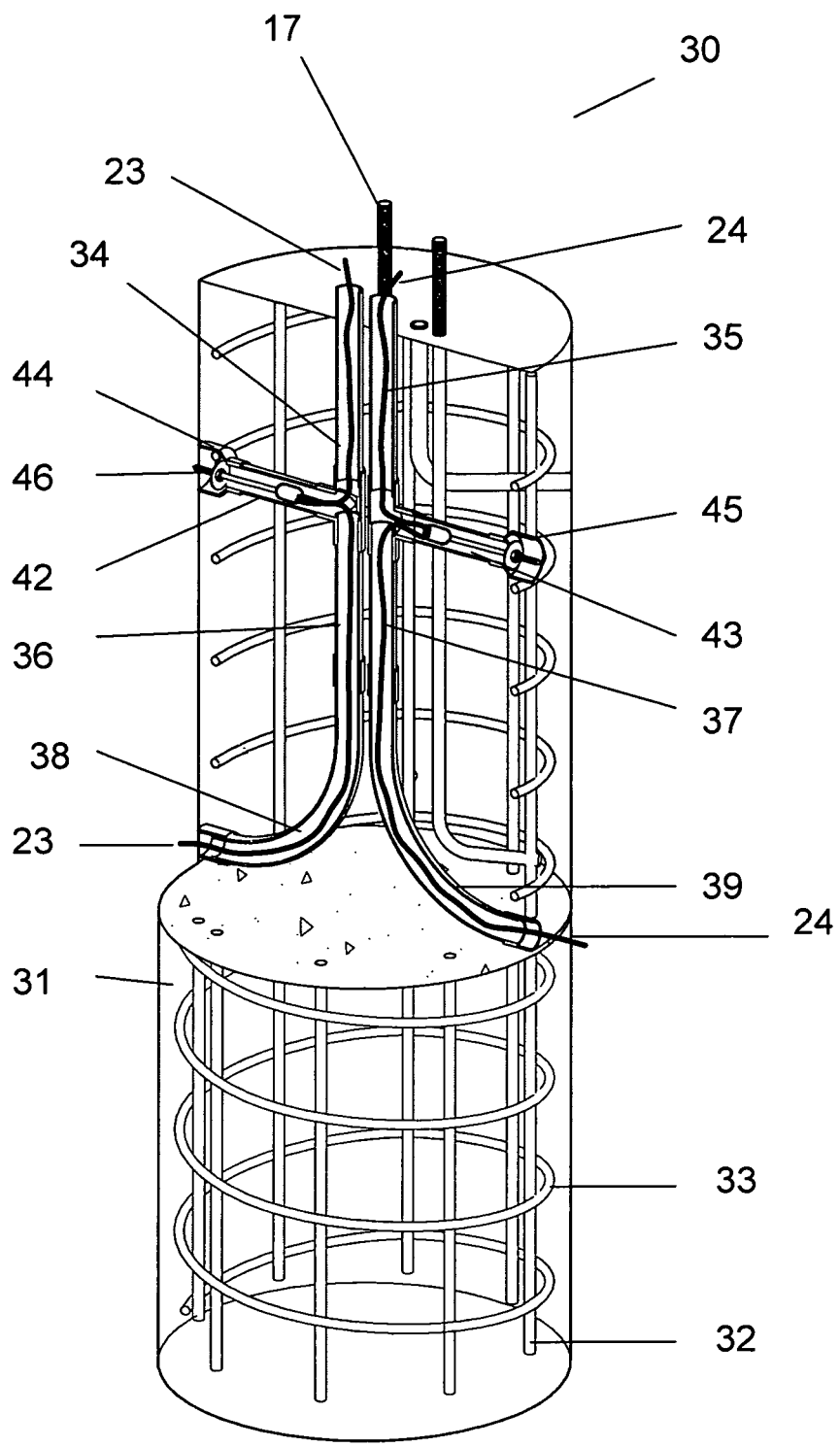
FIG. 5 is a front view, illustrating the embodiment of the instant invention illustrated in FIG. 3, wherein the half upper section of the base has been cutaway in order to show a second manner in which the cables or wires are secured in the security base system.

The first embodiment of the instant invention is illustrated in FIGS. 3 through 10. As illustrated in FIG. 3, it comprises a new utility support base 30 that integrates a wires anti-theft safety or security system, wherein the incoming cable 23 and the outgoing cable 24 are secured inside base 30 as explained below in further details. The security system on base 30 comprises two independent main conduit units 34, 35 that are enclosed in the interior of the base 30. In the interior of the base 30, each set of cables 23, 24 from the underground power distribution system are deviated from a straight upwardly or downward route respectively, since each set of cables 23, 24 are pull into the entrance of a respective lateral passage 42, 43, wherein such cables are inserted through the head section 48 of an head bolt 46 and are further permanently secured to said head bolt 46 as illustrated in FIG. 4. Alternatively, a given section of the wires or cables may be introduced into lateral passages 42 and 43, respectively, as shown in FIG. 5. Base 30 comprises a main body 31 made of a suitable solid. Preferably, main body 31 may be made of cement or concrete, and even more preferably of type A concrete in accordance with the Standard Test Method for Compressive Strength of Cylindrical Concrete Specimens, ASTM C39, in order to add more strength to the whole structure.

Figure 6:
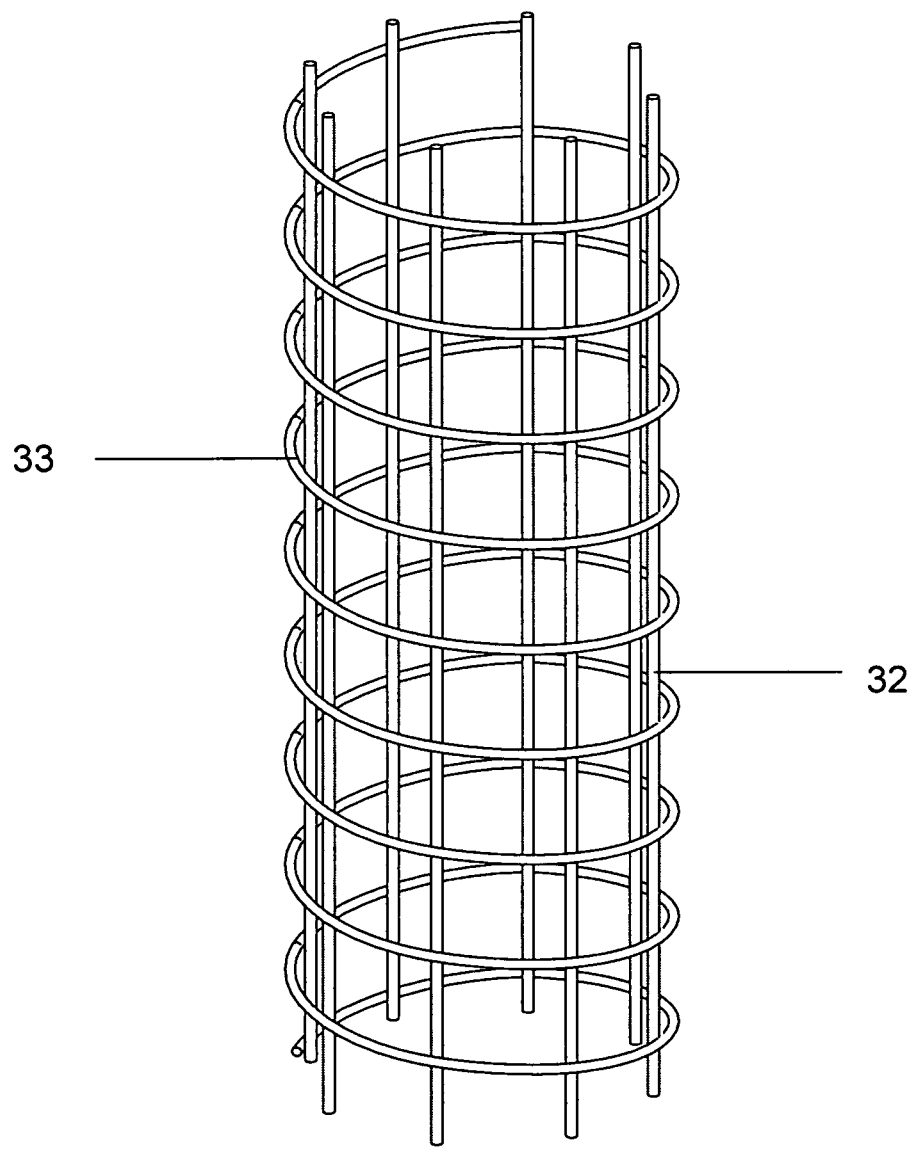
FIG. 6 is a front view of the elements used to strength the base of FIG. 3, wherein the solid main body section of the base and its security system elements are omitted for clarity.

The wires security system is enclosed an internal steel structure exemplified in FIG. 6, wherein the internal security system and the main body 31 have been omitted for clarity. It comprises a series of re bars 32 arrange in a particular manner, preferably in a circular manner, and positioned vertically with respect to the top and bottom sections of the base 30. Said circular and vertical structure may simulates the exterior geometry of base 30 and it is surrounded by a second rebar element in shape of spiral 33 that surrounds the circular structure formed with re bars 32. The diameter of re-bars 33 is preferably smaller than the diameter of re-bars 32. Internal steel structure disclosed in FIG. 6 is presented as an example and potential modifications of the arrangement and geometry of the internal steel structure are within the scope of the instant invention.

Figure 7:
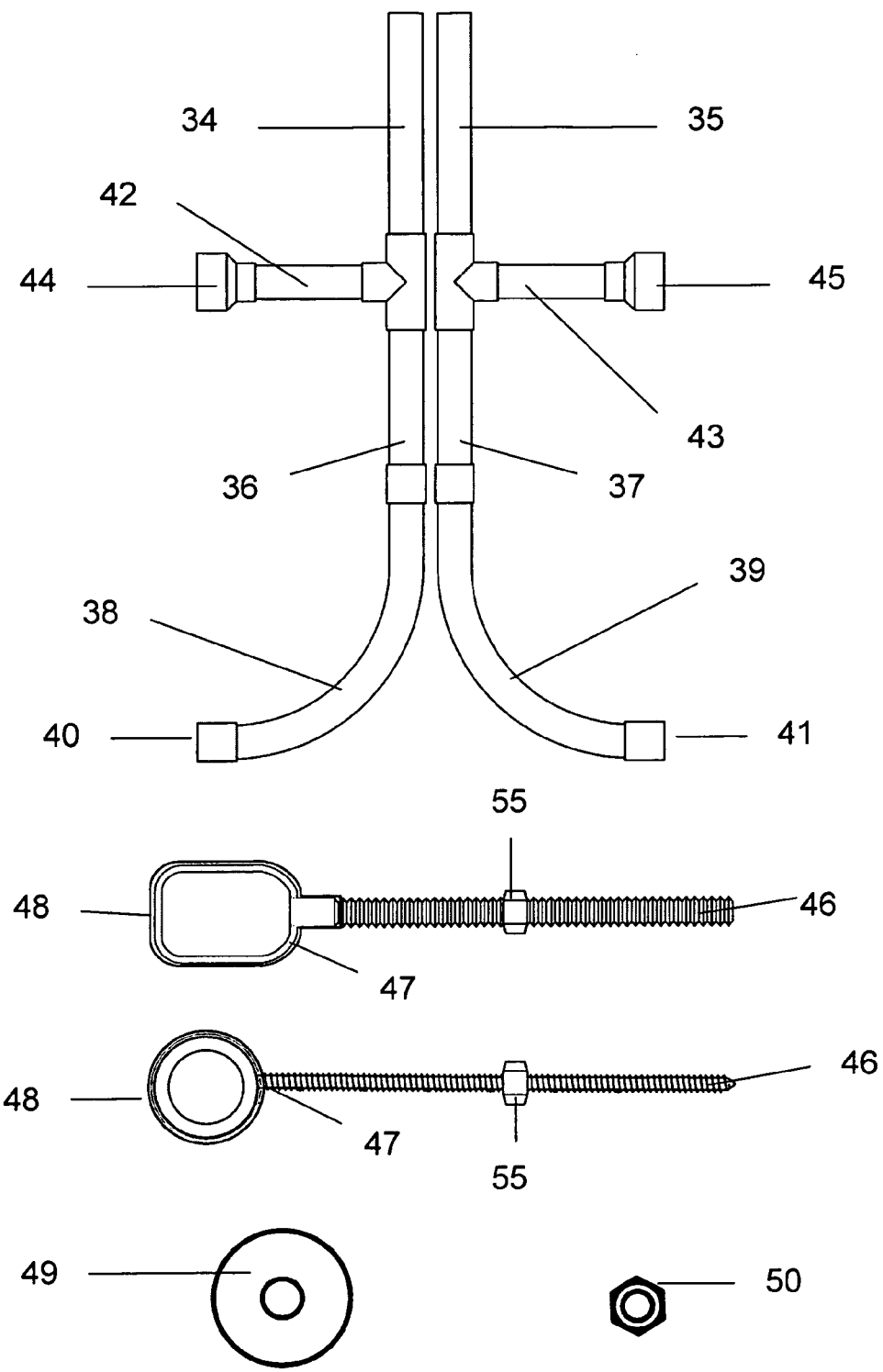
FIG. 7 illustrates elements of the security system used in securing the electric cables at the interior of the base illustrated in FIG. 3.

On the other hand, the individual elements used to create the wires safety system integrated to base 30 according to the invention are shown in FIG. 7, wherein such security elements are illustrated outside of said base 30. It comprises a left main conduit unit 34 and a right main conduit unit 35. The left main conduit unit 34 comprises a left central internal channel 36 in direct communication with a curved lower passage 38, which has a fitting adapter 40 at its distal end. The central internal passage 36 is also in direct communication with lateral passage 42, which has a straight body with its distal end 44 larger in diameter that the rest of its body. In a similar manner, the right main conduit unit 35 comprises a left central internal channel 37 in direct communication with a curved lower passage 39, which has a fitting adapter 41 at its distal end. The central internal passage 37 is also in direct communication with lateral passage 43, which has a straight body with its distal end 45 larger in diameter that the rest of its body.

Each lateral passage 42, 43 are located perpendicularly to the respective central internal channel 36, 37 to which they are connected. In general terms, the diameter of the distal ends of the lateral passages 44, 45 are larger than the diameter of rest of elements of the main conduit units 34, 35. On the other hand, the distal ends 40, 41 of the lower passages 38, 39 provide the receiving or connecting sections, from where the base 30 is connected or joined to the underground power distribution systems. Incoming cables 23 and the outgoing cables 24 enter in and depart from the base 30 respectively from said connecting sections 40, 41.

The main conduit units 34, 35 may be made of any suitable material known in the art and used for protection and housing electrical wiring according to the national and local pertinent regulations; however considering anticorrosion, weight and cost conditions, the use of plastic such as PVC in the entire bodies of the main conduit units is highly preferably. The entire main conduit units 34, 35 may be molded as a single piece or otherwise may be made by assembling already commercially available PVC fittings. For instance, connecting one end of a bend fitting to a corresponding size PVC tubing and the other end of said bend fitting to a corresponding adapter fitting provides the lower section of the conduit unit 34. Coupling the upper section of the resulted structure to a TEE (T) fitting, followed by coupling the free two other ends of the TEE (T) fitting to the corresponding tubing provides the lateral passage 42 and the upper section of the main body of the main conduit unit 34. Coupling the distal end of the lateral passage 42 to the corresponding reducing fitting provides the whole main conduit 34. The same or similar coupling process provides the right main conduit 35; since both main conduits 34 and 35 are mirror images with the same elements.

The security system of base 30 also comprises two head-bolts 46. FIG. 7 illustrates two kinds of bolts 46 that are suitable in according to the invention, among others. However, it is preferably to use the same kind of bolt 46 in a given security base 30. Bolt 46 may be made of a strong suitable material, such as strong plastic or metal. Said bolt 46 has a head section 47 at one of the extremes of its main elongated and threaded body, wherein said head must have a centered opening. As illustrated, bolt 46 may have different geometric structures or shapes as well as different sizes, depending particularly on the diameter, size and amount of wires being protected. Nonetheless, its head section 47 must be able to grasp and secure the wires being protected as explained in more detailed below. Head section 47 of bolt 46 also comprises a plastic jacket 48 surrounding the surface its head 47. Said plastic jacket or coat 48 avoids any damage to the plastic coating of the protected wires. Besides in the case wherein bolt 46 is made of metal, coat 48 prevents any direct contact the metal of the head bolt 46 with the wires or cables being protected. Bolt 46 also comprise an adjusting nut 55, useful in adjusting the required length in the securing process as explained in detailed below.

As illustrated in FIG. 7, the security system also comprises a washer 49 and nut 50. Alternatively, washer 49 and nut 50 may be welded together forming a single adjusting unit. The diameter of the washer 49 preferably matches the internal diameter of the reducing coupling at the distal ends 44, 45 of the lateral passages 42, 43.

Figure 8:
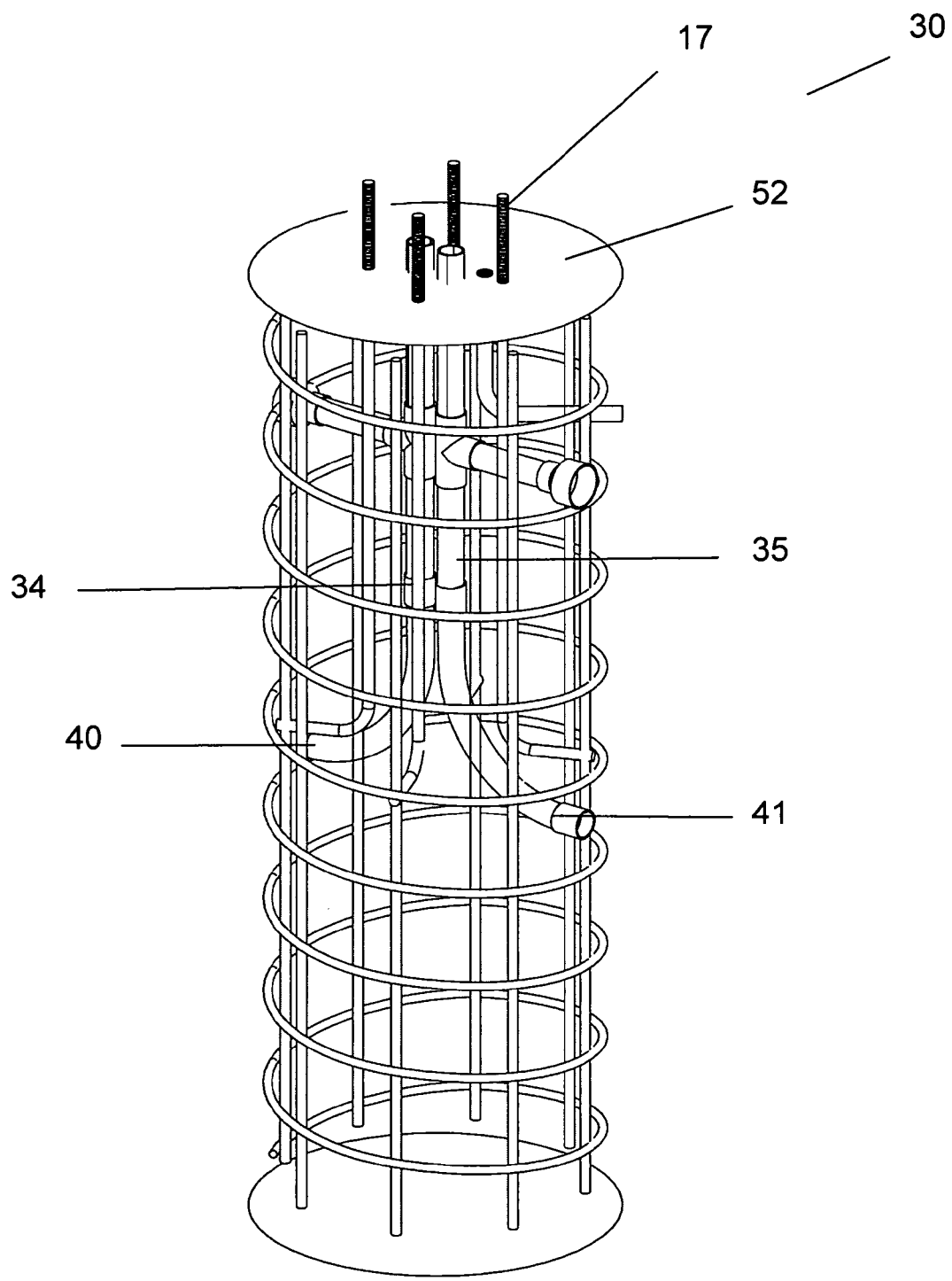
FIG. 8 is a perspective view, illustrating the supported base illustrated in FIG. 3 previous to the insertion of the electrical cables or wires, wherein the concrete main solid body of the base has been omitted in order to show its internal components.
Figure 9:
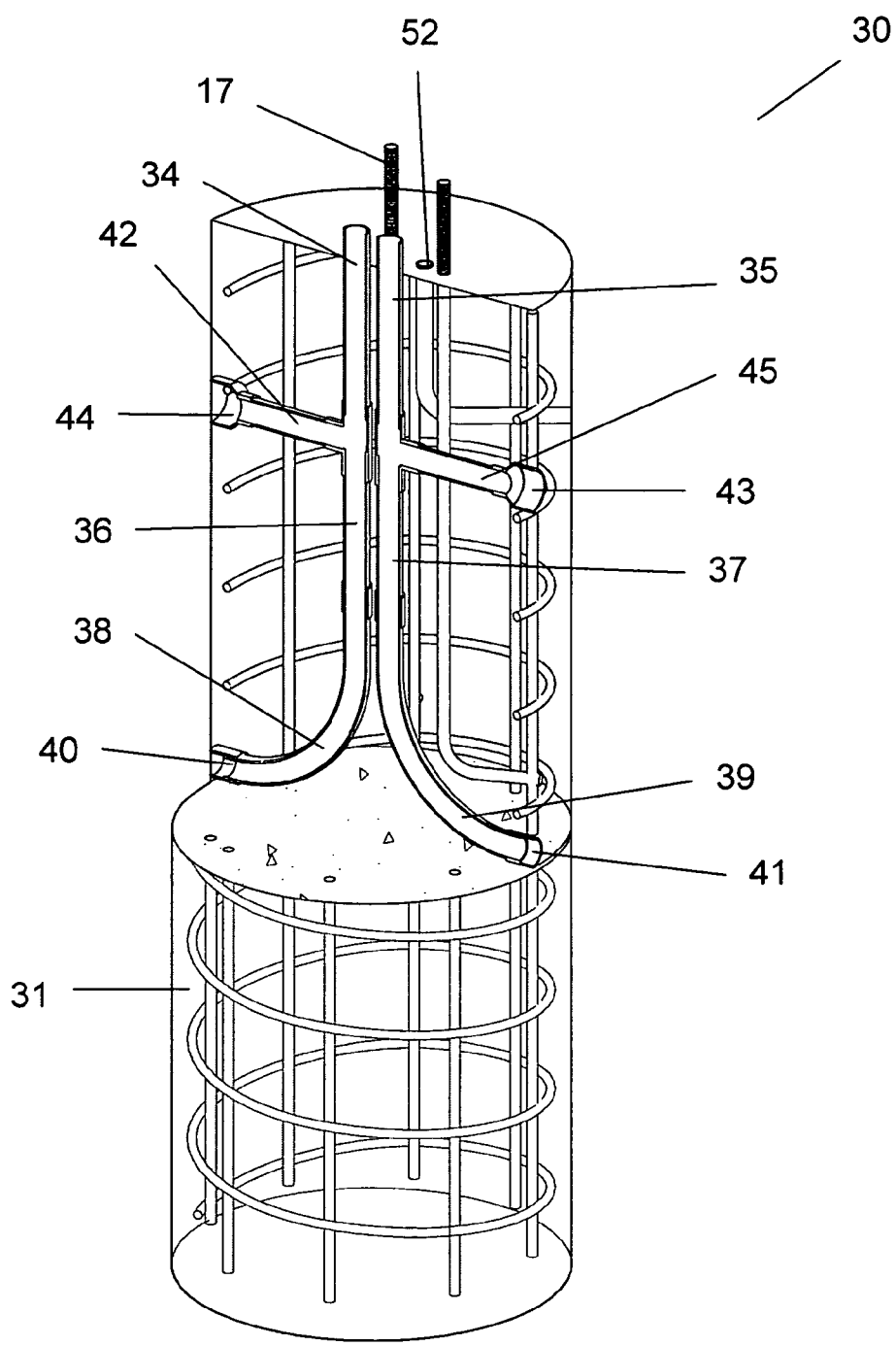
FIG. 9 illustrates the supported base as shown in FIG. 8 before the insertion of the electrical cables or wires, wherein the front section of the base has been cut off in order to show its internal details.

FIGS. 8 and 9 illustrate the supported base 30 according to the invention, previous to the insertion of the electrical cables 23, 24. FIG. 8 shows security base 30, wherein the front section of the concrete main body 31 has been omitted in order to show the interaction of the internal components of said base 30. FIG. 10 shows the internal details of the security base, wherein the front section of the security system has been cutaway and wherein the wires have been already introduced. The wires security system in base 30 is surrounded by the re-bar arrangement and comprises the two main conduit units 34 and 35, which provide accommodation or housing to the incoming and to the outgoing cables 23, 24 respectively. Said two main conduit units 34, 35 are placed in opposite position relative to each other. Regardless of the manner that the cables 23, 24 are inserted in the security system of base 30, such wires or cables 23, 24 are extended independently through each main conduit unit 34, 35 sections. Multiple anchor bolts 17 are included in order to support the flange wherein the utility pole is installed. FIG. 9 illustrates the internal section of the two main conduit units 34 and 35, wherein the front section of the security system and base 30 have been cut off in order to show internal details of the security base 30, previous to the insertion or securing of the wires. Similarly, FIG. 9 shows the interior of the base without the wires or cables inserted in the security system. As illustrated in FIG. 10, bolts 46 are inserted into the interior of the lateral conduit or passages 42 and 43.

As shown in FIG. 10, initially, the cables 23 and 24, may be extended or introduced in the curved lower sections 38, 39 respectively from where are extended into the internal central channels 36 and 37 respectively; following from there to the upper sections of the main conduit units 34 and 35, after passing individually through the head sections 47 of bolts 46. From the upper section of main conduits 34 and 35, each end of the cables goes out to the hand hole 25 via independent exits located at the top of the base 30, as illustrated in FIG. 3.

As illustrated in FIGS. 8, 9 and 10, base 30 also has incorporated anchor bolts 17 to attach the utility post to the base 30 and a ground channel 52 for housing the ground element 60. The relative dimensions base 30 and its different components may be variable and depends mostly of the dimensions and weight of the post to be supported and the thickness of the wires or cables being secured. For instance, for a post having dimensions of about 30 to 45 feet, a base with an external diameter of 24 inches and a height of 66 inches is highly preferably. In such case, re bars 32, which are arranged in a circular manner may have a diameter of ⅝ inches and may be positions with a distance of 7 and ⅞ one from the others in order to form the illustrated circular structure. Similarly, the use of re bars having a diameter of half inch are the preferred in order to form the spiral shaped 33. Regarding the main conduits units 34, 35 the preferred diameter is of 2 inches at the central internal channels 36, 37 the lateral passages 42, 43 and the lower curved passages 38, 39 while the preferred diameter of the extremes or distal ends 44, 45 of the lateral passages 42, 43 is of three inches. The recommended length of the lower curved passages 38, 39 is of 15.5 inches, while a lateral passages length 42, 43 of 10 inches is preferable. Regarding the internal channel 36, 37 a length of 22.5 inches is preferable. The total preferred length for the whole main conduit units 34, 35 is of 36 inches. On the other hand, the required head bolts 46 have a length of 12 inches and a diameter of half inch, while its head section 47 has a diameter of 2 inches. Similarly, the preferred dimensions for the required washer 49 are an internal diameter of half inch and an exterior diameter of three inches while for the required nut 50 an interior diameter of half inch is preferred.

Base 30 may be made by assembling the required re-bar reinforcing structure with re bars 32 and 33 inside a mold or cast; followed by setting both main conduit units 34, 35 and ground housing 52 and placing it inside the resulting reinforced structure. Filling the mold structure with liquid concrete and allowing the concrete to dry provides the solid structure after the cast is removed. Although the insertion of the head bolt 46, washer 49 and nut 50 may be included in the main conduit units 34, 35 previous to positioning it inside the mold, it is preferred to insert such elements after the base 30 is already made.

Previous to the insertion of the electrical wires, an head bolt 46 having its head section 47 jacketed with plastic 48 is inserted to the main conduit units from the distal ends 44, 45 of each one of the lateral passages 42, 43 up to the center of the corresponding central internal channel 36, 37. Conveniently, nut 55 must be threaded to a suitable distance in the elongated body of the bolt 46, in such a manner than it is in contact with the washer 49 after tightening nut 50. Thus after tightening nut 50, washer 49 is between nut 55 and nut 50 at the end section of bolt 46, as illustrated in FIGS. 4 and 5.

In operational terms, one option among others, directed to secure the wires or cables using the security base 30 by replacing a common base, such as 20 with a base 30, is the process requiring the following steps: (1) disconnect the electrical connections of the wires coming from and returning back to the underground power distribution system 23, 24 from the wires 21, 22 that are feeding directly the lighting fixture 12 on the post 14; (2) disconnecting the cables of the underground power distribution system connected the posts adjacent to the post supported by the base intended to be changed; (3) removing the cables or wires from the underground (4) removing the post and the base to be changed from the connection site; (5) install the new base 30, fixing it to the ground and connecting it to the underground housing via the fitting at the distal ends 40, 41 of the lower curved passages 38, 39; (5) re-installing the post to the new base 30; (6) wiring the base 30 until the extremes of the wires are at the top of said base (7) tightening the corresponding nut 50, preferably until the wires are pull toward the entrance of lateral conduits or passages 42 and 43, in such a manner that the direction of the wires is deviated from the straight position to an angled position at the entrance of said lateral passages 42 and 43 by the action of tightening nut 50, as illustrated in FIG. 4 or alternatively as illustrated in FIG. 5; (8) reconnect the electric connection to feed the lighting fixture and (9) cutting the extremes of the head bolts 46 and (10) plastering the distal end of each lateral passage with, for instance fresh cement mixture and finally, re-buried the new installed base 30.

Regardless of the optional process carried out in order to wiring base 30, each set of wires or cables 23, 24 are independent passed through the lower passages 40, 41; extended upwardly through the internal center channels 36, 37 and must be passed through the head 47 of the bolt 46 and its ends must be provided at the top the main conduit units 34, 35 located at the top of the base 30. As illustrated in FIGS. 4 and 5, once each bolt 46 already having the cables through its head are tightened, said tightening action pulled the cables 23, 24 passing through the head bolt 46 to the near entrance 44, 45 of the respective lateral passages 42, 43. As a result, all the cables 23, 24 are pulled toward the internal entrance of the corresponding lateral conduits or passages 42, 43 and are further secured by means of each head-bolt 46. As illustrated in FIG. 4, each nut 50 is tightening until wires 23 and 24 are in an angled position toward the entrance of the lateral passages 42 and 43. Alternatively, nut 50 may be tightening until a given section of each the wires of cables 23 and 24 are introduced inside the corresponding internal cavity of the lateral conduit or passages 42 and 43, as shown in FIG. 5. the After tightening nut 50, accordingly to any of the options: (1) just until the wires are in an angled position at the entrance of the internal passages or alternatively, (2) until a given section of the wires are indeed inside such internal lateral passages 42 and 43; the threaded sections of each bolt that exceeds the internal cavity of the lateral sections 42, 43 are cut off. As mentioned previously, in the following step, each external end section or distal end of the lateral passages 42, 43 are plastered in order completely and permanently seal any possible access to the nuts (50) or the interior of the lateral passages 42, 43. Because of the internal distribution of the cables at the interior of the base 30, and its locking state regarding the head bolt 46, pulling the extremes of the wires 23, 24 from the hand hole 25 would not results in the withdrawal of such cables at all.

The second embodiment of the invention is illustrated in FIGS. 11 through 15 is a solid stopper security stand 65 comprising a security wire system. It may be inserted along the underground lines of the power distribution system, with the purpose of providing a security point at the underground wires along the underground lines, thus once the wires are pulled out, the lines are unable to be withdrawn from the underground system. As illustrated in FIGS. 11-13, it comprises an inverted shaped housing 56 enclosed in a solid main body 57, that may be made of concrete or cement; a main upper passage 58 perpendicular to and in direct communication with lower passage or conduit 59. Left and right ends of the lower passage 59 are fitted with coupling units 63 and 64, providing the connection sections of the stand 65 with the underground power distribution system. Said main body 57 may be reinforced with a metal frame similar to the one used in embodiment 30

Said housing 56 may be made of any suitable material, preferably from plastic, as the internal housing of the previous embodiment, security base 30 as discussed above. It may be molded in as a single piece or formed by coupling the proper PCV fittings. As illustrated in FIG. 12, both lower sections of the inverted T shaped housing are fixed with connecting fittings or sections in order to connect the stopper stand 65 to the underground housing carrying the electrical wires or cables 23 or 24. The distal end of upper section 58 of housing 56 is connected to a reducer fitting 62, which supports head bolt 46 via washer 49 and nuts 55 an 50. Similarly as discussed above in the case of the first embodiment security base 30, the head section 47 of the bolt 46 is coated with plastic 48 in order to avoid damages of the wires being protected. The particular dimensions of the stopper stand 65 and its elements may be variable and conveniently selected depending of, for instance the numbers or thickness of the wires being secured. Said device or stopper 65 may be made by positioning the housing 56 at the interior of a suitable mold or cast, followed by adding fresh concrete mixture to the cast. After allowing the concrete mixture to dry, stand 65 is provided. The geometry of the external body of 65 as well as its shape or size may be variable, depending on the particular needs and the size of the wires required to be protected. A sensor known in the art, such as an electronic sensor may be included in the main body of 65 in order to allow it detection after being buried in the power distribution system.

Figure 14:
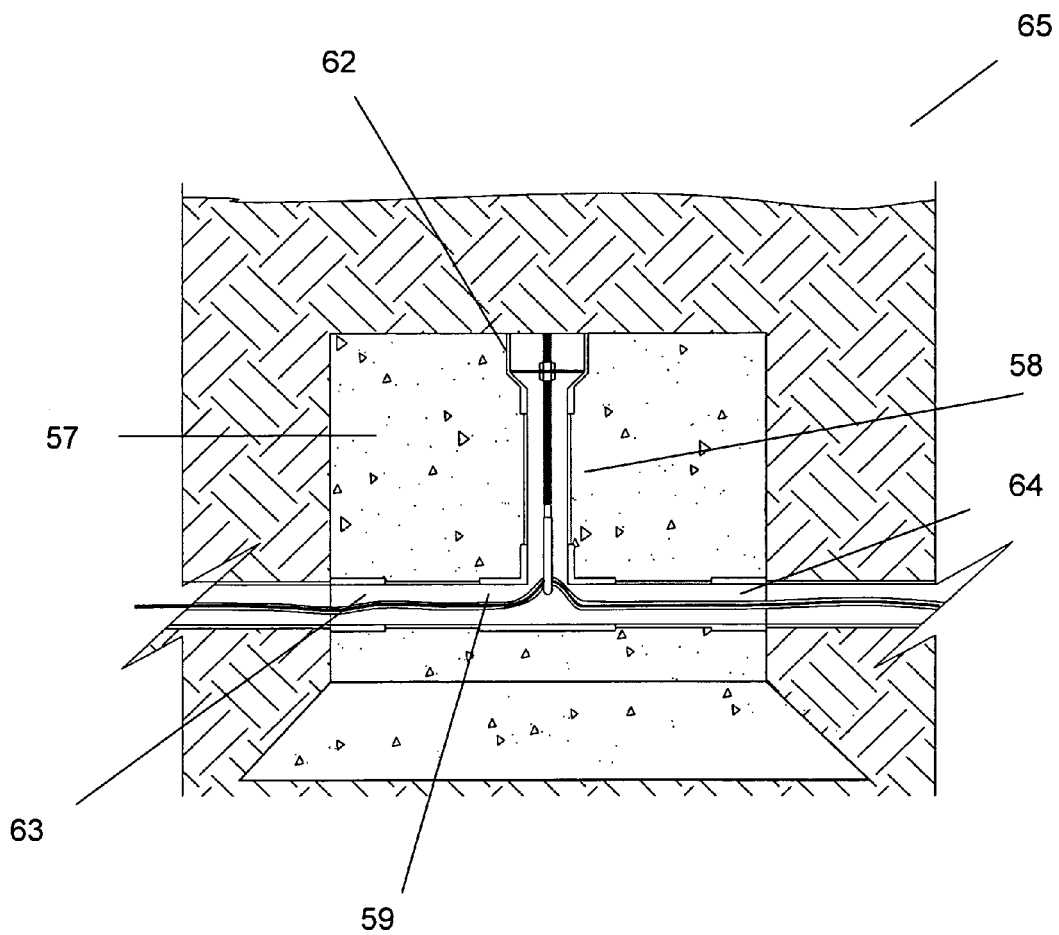
Figure 15:
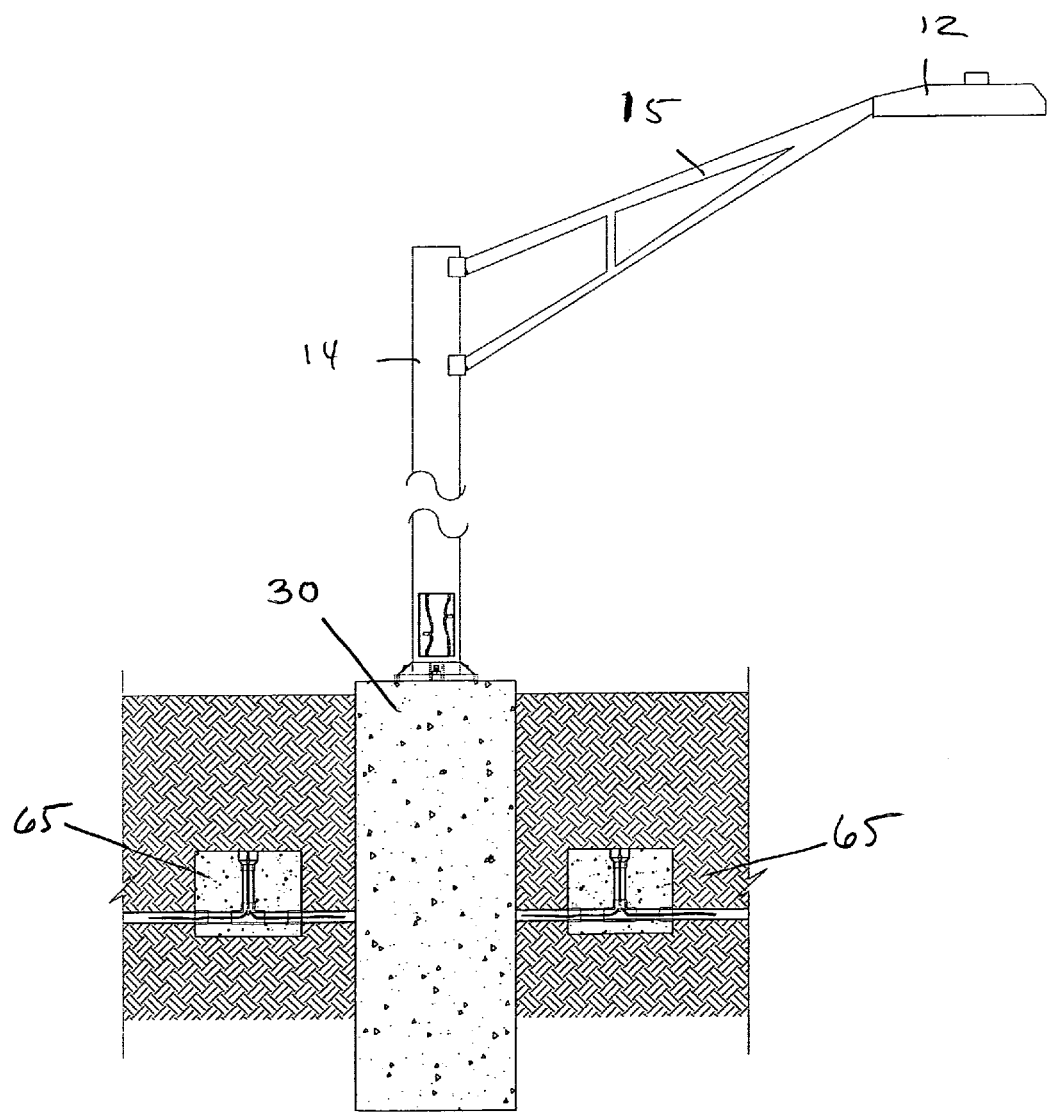
FIG. 15 illustrates one example in which the security stand and the security base according to the instant invention may be used in securing electrical wires or cables of the power distribution system.

In operational terms, the stopper stand 65 may be positions in between the underground power housing line in such a manner that there are an incoming end and an outgoing end of the power distribution system housing, as illustrated in FIG. 12. Initially, the head bolt 46 is just right at the center of lower passage 59 via the internal cavity of upper section 58. After passing the wires or cables 23 or 24 through the head 47 of the bolt 46, nut 50 is tightening until the wires are pulled up with the head 47 until the straight position of the protected wires is angled toward the upper passage 58 as illustrated in FIGS. 13 and 14, wherein stopper 65 is shown with different shaped main concrete bodies 57. In the following step, the fittings 63, 64 may be permanently connected to the incoming and outgoing ends of the housing of the underground power distribution system. The installation then continues by cutting the excess of the bolt 46 coming out of 57 and sealing and/or plastering the access to the nut 50 with fresh cement mixture or similar sealing. Finally, after the installation is complete, the surface above the whole line is properly buried. At the convenience of the situation, multiple stopper stands 65 may be installed along the underground power system in permanent and not disclosed locations as illustrated in FIG. 15. Even more conveniently, and whenever possible, both of the disclosed embodiments 30 and 65 of the invention maybe used in combination if desired.

What it is claim is:

1. A device, useful for securing wires or cables used in power distribution systems and other utilities services, said device comprising:
    (a) an upright vertical main solid body, said body having a top surface, a lower surface and lateral surfaces;
    (b) a main security conduit system, permanently located inside of said main solid body, said main security conduit system comprising:
        a first upright conduit unit, said first upright conduit unit comprising
            a top straight section having a top end that is open at the top surface of said main solid body;
            a lower curved section having a lower end connected to a connecting unit and that is open at the left side of the main solid body;
        a first straight lateral conduit unit having a lateral end that is connected to a coupling unit with a larger diameter than the diameter of said straight lateral conduit and is open at the lateral left side of said main body, said lateral conduit unit being connected perpendicularly to and in open communication with the top straight section of the first upright conduit unit;
        a second upright conduit unit, said first upright conduit unit comprising:
            a top straight section having a top end that is open at the top surface of said main solid body;
            a lower curved section having a lower end connected to a connecting unit and that is open at the right side of the main solid body;
        a second straight lateral conduit unit having a lateral end that is connected to a coupling unit with a larger diameter than the diameter of said straight lateral conduit and is open at the lateral right side of said main body, said lateral conduit unit being connected perpendicularly to and in open communication with the top straight section of the second upright conduit unit;
    (c) a first bolt comprising:
        an elongated threaded body;
        a head section located at one of the ends of said elongated threaded body, said head section being surrounded with a plastic cover and having a centered opening in said head section;
        a first nut, a washer and a second nut inserted in the elongated threaded section of the bolt in a manner that said washer is between the first nut and the second nut;
    (d) a second bolt comprising:
        an elongated threaded body;
        a head section located at one of the ends of said elongated threaded body, said head section being surrounded with a plastic cover and having a centered opening in said head section;
        a first nut, a washer and a second nut inserted in the elongated threaded section of the bolt in a manner that said washer is between the first nut and the second nut and;
wherein the first bolt is inserted into the first lateral conduit unit in a manner that the head section of the bolt is inside the intersection of the lateral conduit unit with the top section of the first upright conduit unit and the second bolt is inserted in the second lateral conduit unit in a manner that the head section of the said second bolt is inside the intersection of the lateral unit with the top section of the second upright conduit unit.

2. The device, as recited in claim 1, wherein the main solid body is made of concrete.

3. The device of claim 1, wherein the first and second bolts are made of cement.

4. The device of claim 1, wherein the main security conduit system is made of hard plastic.

5. The device of claim 1, wherein the first and second bolts are made of hard plastic.

6. The device of claim 1, wherein the first and second bolts are made of metal.

7. The assembly of claim 1, further comprising a metal support structure made of re-bars and located permanently inside said main solid body.

8. The device of claim 1, further comprising multiple anchor bolts permanently inserted in the main solid body, each one of said multiple anchor bolts exposing its threaded sections at the top surface of said main solid body.

9. The device of claim 8, further comprising a flange located at the top surface of the main solid body, said flange having multiple holes inserted in the threaded ends of the multiple anchor bolts.

10. The device of claim 9, further comprising a ground channel at the top section of said main solid body.

11. The device of claim 10, further comprising a ground element inside the ground channel.

12. A device, useful for securing wires or cables of the power distribution systems, said device comprising:
    (a) a main solid body having a top surface, a bottom surface and lateral surface;
    (b) a security conduit system, permanently located inside of said main solid body, said security conduit system comprising:

a vertical upright conduit unit having a upper end and a lower end, a coupling unit attached to said upper end having diameter larger than the diameter of said vertical conduit, said upper end being open at the top surface of said main solid body;

a main conduit unit horizontally positioned in respect to the vertical conduit unit having a right side end and a left side end, wherein said left and right ends are attached to coupling units that are in open communication with the external left and right lateral surfaces of said main solid body, and wherein said main conduit unit is located substantially perpendicular to and in open communication with the lower end of said vertical upright conduit unit and;

(c) a bolt comprising:
an elongated threaded body;
a head section located at one of the ends of said elongated threaded body, said head section being surrounded with a plastic cover and having a centered opening in said head section;

(d) a first nut, a washer and a second nut inserted in the elongated threaded section of the bolt in a manner that said washer is between the first nut and the second nut and;

wherein the bolt is inserted inside the upright vertical unit in a manner that the head section of said bolt is located at the intersection of the upright conduit unit with the main conduit unit while the elongated and threaded section of said bolt is located inside the upright conduit unit and wherein said upper, left and right ends allow access to the interior of the conduit system through the external surface of the main solid body.

13. The device as recited in claim 12, wherein the main solid body is made of concrete.

14. The device as recited in claim 12, wherein the main solid body is made of cement.

15. The device as recited in claim 12, wherein the security conduit system is made of plastic tubing.

16. The device as recited in claim 12, wherein the main solid body is supported by a permanently integrated metal support structure.

17. The device as recited in claim 12, wherein the bolt is made of plastic.

18. The security device as recited in claim 12, wherein the bolt is made of metal.

19. The security device as recited in claim 12, wherein the main solid body has integrated an electronic sensor.

20. A process to secure underground wire of the power distribution systems using the assembly recited in claim 1, said process comprising:

1) inserting the wire into the first conduit unit via the left curved end and though out the whole first conduit unit until the end of said wire comes out at the top end at located at the top surface of said main body;
2) tightening the second nut until the wire being secured is angled toward the entrance of the first lateral conduit unit;
3) repeating steps 1 and 2 at the second conduit unit with a second wire
4) electrically connecting the ends of the wires at the top of the assembly to a utility pole.

* * * * *